US011837974B2

(12) United States Patent
Bachmaier et al.

(10) Patent No.: US 11,837,974 B2
(45) Date of Patent: Dec. 5, 2023

(54) STROKE TRANSMITTER FOR AN ACTUATOR DEVICE (71) Applicant: MetisMotion GmbH, Munich (DE)

(72) Inventors: Georg Bachmaier, Munich (DE);
Matthias Gerlich, Munich (DE);
Takeru Nemoto, Munich (DE);
Wolfgang Zoels, Munich-Lochhausen (DE)

(73) Assignee: MetisMotion GmbH, Munich (DE)

( * ) Notice: Subject to any disclaimer, the term of this patent is extended or adjusted under 35 U.S.C. 154(b) by 29 days.

(21) Appl. No.: 17/604,275

(22) PCT Filed: Apr. 17, 2019

(86) PCT No.: PCT/EP2019/059929
§ 371 (c)(1),
(2) Date: Oct. 15, 2021

(87) PCT Pub. No.: WO2020/211937
PCT Pub. Date: Oct. 22, 2020

(65) Prior Publication Data
US 2022/0200486 A1    Jun. 23, 2022

(51) Int. Cl.
H02N 2/04        (2006.01)
B66D 1/08        (2006.01)

(52) U.S. Cl.
CPC .............. H02N 2/043 (2013.01); B66D 1/08 (2013.01); B66D 2700/025 (2013.01)

(58) Field of Classification Search
CPC .. H02N 2/043; F15B 7/06; B66D 1/08; B66D 2700/025
See application file for complete search history.

(56) References Cited

U.S. PATENT DOCUMENTS 4,142,551 A * 3/1979 Wilms ..................... B67D 9/02
                                                        212/308
2008/0210031 A1* 9/2008 Uberti ..................... F16H 61/30
                                                         74/335
(Continued)

FOREIGN PATENT DOCUMENTS

AT        184333 B     1/1956
CN       1962393 A     5/2007
(Continued)

OTHER PUBLICATIONS

JPO; Office Action from Japanese Patent Application No. 2021-561692; dated Jan. 5, 2023; 8 pages.
(Continued)

Primary Examiner — Emily P Pham
(74) Attorney, Agent, or Firm — Fitch, Even, Tabin & Flannery, LLP (57) ABSTRACT The invention relates to a stroke transmitter for an actuator device. The stroke transmitter comprises a first and a second conversion unit, which are mechanically connected to one another in series, wherein the first conversion unit is designed as a hydraulic conversion unit, it can be connected to an actuator on its drive side and it is connected to the drive side of the second conversion unit on its output side, wherein the second conversion unit is designed as a cable system and has an output element on its output side. The invention also relates to an actuator device comprising an actuator and a stroke transmitter mechanically connected in series with the actuator.

15 Claims, 6 Drawing Sheets (56) References Cited

U.S. PATENT DOCUMENTS

| | | | | |
|---|---|---|---|---|
| 2012/0018542 | A1* | 1/2012 | Bachmaier | F16K 41/10 |
| | | | | 239/584 |
| 2012/0067692 | A1* | 3/2012 | Forster | E01C 23/088 |
| | | | | 198/318 |
| 2014/0014318 | A1 | 1/2014 | Mail | |
| 2014/0262525 | A1* | 9/2014 | Fuller | E21B 10/322 |
| | | | | 175/57 |
| 2014/0263141 | A1* | 9/2014 | May | B66C 21/04 |
| | | | | 212/242 |
| 2016/0152451 | A1* | 6/2016 | Vestre | B66C 23/52 |
| | | | | 254/323 |
| 2019/0271336 | A1 | 9/2019 | Zöls et al. | |
| 2022/0205463 | A1 | 6/2022 | Bachmaier | |

FOREIGN PATENT DOCUMENTS

| | | |
|---|---|---|
| CN | 102378858 A | 3/2012 |
| CN | 104582910 A | 4/2015 |
| CN | 105745832 A | 7/2016 |
| DE | 102011002988 A1 | 7/2012 |
| DE | 102013219759 A1 | 4/2015 |
| DE | 102016213654 A1 | 2/2018 |
| DE | 102017214697 A1 | 2/2019 |
| EP | 3490017 A1 | 5/2019 |
| FR | 1378684 A | 11/1964 |
| FR | 2522081 A1 | 8/1983 |
| JP | 2014193015 A | 10/2014 |
| SU | 636538 A1 | 12/1978 |
| WO | 2017171597 A1 | 10/2017 |
| WO | 2017198420 A1 | 11/2017 |
| WO | 2020211936 A1 | 10/2020 |
| WO | 2020211992 A1 | 10/2020 |

OTHER PUBLICATIONS

CNIPA; Office Action from Chinese Application No. 201980095684.9; dated Sep. 14, 2023; 22 pages.

PCT; App No. PCT/EP2019/059929; International Search Report and Written Opinion dated Jan. 22, 2020.

* cited by examiner

STROKE TRANSMITTER FOR AN ACTUATOR DEVICE

CROSS-REFERENCE TO RELATED APPLICATIONS

This application is a U.S. national phase application of International Application No. PCT/EP2019/059929, filed Apr. 17, 2019, designating the United States.

FIELD

The present invention relates to a stroke transmitter for an actuator device, which comprises a hydraulic transmission unit, which is connectable to an actuator. Further, the invention relates to an actuator device comprising such stroke transmitter.

BACKGROUND

From the prior art above all piezo-hydraulic actuator devices are known that typically comprise a piezo actuator and a hydraulic transmission unit, wherein the piezo actuator acts as drive for the hydraulic transmission unit. A key feature of such combined actuator devices is that by the presence of a hydraulic unit a substantially larger mechanical stroke can be achieved than by the piezo actuator alone. This can for instance be achieved by a transmission ratio in the hydraulic unit and/or by a pump effect in the hydraulic unit causing a summation of the effect of numerous small individual motions of the piezo actuator. Hereby a main disadvantage of the piezo actuator and also of other known solid state actuators is overcome, namely their low stroke. Such piezo-hydraulic actuators are for instance known from the unexamined specification documents laid open to public inspection DE 102016213654 A1 and DE 102013219759 A1.

However, numerous applications for actuator devices exist in which an even further stroke increase would be desirable than can be achieved with such a single-stage hydraulic transmission unit. For instance there are many applications, in which an actuator device must provide a mechanical stroke of several mm and in part even several centimeters. Examples thereof are actuator devices in robotics, for adjusting lifting tables, for metering an injection of a fluid or for triggering a switching process in a switching device. For many of these applications not only a high stroke is required but at the same time also a high speed. For instance in several applications the total trigger time from electrical controlling of the actuator until completion of the entire movement must amount to only few milliseconds (or in part even less). A further requirement that is important with many of the named applications is an as efficient as possible transmission of electrical into mechanical energy. A further requirement that is important with many of the named applications is the transmission of a relatively high force on the output side. This means that there exists an overall need for both a stroke transmitter as well as an actuator device equipped with it, which fulfill as well as possible the named requirements for stroke, dynamics, energy efficiency and force at the same time. Therein the energy of the overall system is limited by the energy of the actuator, wherein by the stroke transmitter the ratio between stroke and force can be adjusted. In this connection there is a particular need for a stroke transmitter that is configured in such a way that for the respective application a suitable compromise between the boundary conditions, which in part cannot be fulfilled at the same time, can be found as flexibly as possible.

It is therefore the object of the invention to indicate a stroke transmitter which overcomes the named difficulties. In particular a stroke transmitter is to be provided which in an actuator device within the scope of the total energy available allows for a high stroke, high dynamics, a high energy efficiency, and a high force transmission, at the same time. The setup of the stroke transmitter therein is to facilitate in a way as simple as possible the adjustment of a compromise between the named parameters, which is adjusted to the respective application. It is a further object of the invention to provide an actuator device with such a transmitter.

SUMMARY

These objects are solved by the stroke transmitter described in claim 1 and the actuator device described in claim 11. The stroke transmitter according to the invention is designed as stroke transmitter for an actuator device. It comprises a first and a second transmission unit, which are mechanically connected in series with one another. Therein the first transmission unit is configured as a hydraulic transmission unit and, on its drive side, is connectable to an actuator. On its output side, it is connected to the drive side of the second transmission unit. The second transmission unit is configured as a cable system and, on its output side, comprises an output body.

Therein the named output body of the cable system is a superordinate output body of the entire stroke transmitter. The stroke transmitter in particular, on its drive side, also comprises a corresponding drive body, which can be connected to the actuator of the actuator device.

The term "mechanically connected in series" here is to be understood as generally meaning that the output side of the first transmission unit is connected to the drive side of the second transmission unit in a force-transmitting and motion-transmitting way. Thus, the cable system in particular is to be connected to the side of the hydraulic transmission unit opposite the actuator in a force-transmitting way. The hydraulic transmission unit thus after the actuator forms the first transmission stage, and the cable system forms a downstream second transmission stage. By these two stages a total transmission ratio is obtained, which is composed of the individual transmission ratios of the hydraulic transmission unit and of the cable system in a multiplicative manner. The cable system in turn, on its drive side, is mechanically coupled to the hydraulic transmission unit and, on its output side, connected to the movable output body. This output body may for instance generally be a translation body or also a rotation body. In connection with the invention it is only significant that this output body is suitable for transmission of a mechanical stroke to an external element.

The cable system is in particular a mechanical transmission system with a cable as the motion-transmitting component. Therein the drive side is located in the area of a first cable end and the output side is located in the area of a second one.

A key advantage of the design according to the invention is that the arrangement comprising two transmission units connected in series allows for achieving a relatively large stroke of the output body, even if the used actuator itself can only generate a comparatively low stroke. In this way, in particular also when using a solid state actuator with a small input stroke, an output stroke of in particular several millimeters, which is necessary for the respective application, can be generated.

It can be seen as a further advantage that this comparatively large stroke can be achieved even in the case of short trigger times of only a few milliseconds in particular. This is given above all by the high rigidity of the entire transmission system.

On the one hand, the hydraulic transmission unit can be designed relatively easily with a high rigidity. This can be achieved in particular by using a comparatively low working volume of the hydraulic fluid, by chamber walls of low lateral deformability and/or by using pistons as stroke elements. In general, hydraulic transmission units are particularly suitable for stroke transmission with high dynamics. In the present context "high dynamics" of the transmission unit is to be generally understood as a fast temporal response behavior. In other words, "high dynamics" is meant to refer to the fact that a brief, fast motion on the drive side with a small time offset and a small temporal expansion is transmitted into a correspondingly brief, fast motion on the output side.

Besides the hydraulic transmission unit also the cable system, which is connected in series, can be realized relatively easily with a high mechanical rigidity and correspondingly high dynamics. Above all when choosing cable materials of low elasticity and high tensile strength in such a cable system, it is relatively easy to achieve a high rigidity with relatively low mass of the moved parts at the same time.

It can be seen as a further advantage that the large stroke and the high dynamics can be achieved with a comparatively low peak performance. This is in particular facilitated by the fact that both the generation of the stroke in the actuator as well as the stroke transmission in the two transmission stages can be effected in a comparatively energy-efficient way. In particular when using a solid state actuator relatively small losses occur in the generation of the primary stroke. Also the hydraulic transmission unit can easily be operated with small energy losses, above all when the working volume and thus the moved mass of the hydraulic fluid can be kept low. Also the cable system can easily be operated with small energy losses, above all when the cable has a low elastic deformability.

To sum up, this means that by the stroke transmitter according to the invention the requirements for the height of the stroke and the trigger speed for various ones of the named applications can be realized, wherein at the same time in total an energy-efficient transmission is effected. This may in particular be an efficient transmission of an electrical energy employed for the operation of the actuator into a mechanical motion energy of the output body.

In comparison with a purely hydraulic stroke transmitter the two-stage combination of hydraulics and cable system according to the invention facilitates not only a particularly large stroke but at the same time also a comparatively low mass. A cable system in comparison with a hydraulic transmission unit in the case of a comparable transmission ratio can namely be realized clearly easier with a low total mass. In comparison with a pure cable system the two-stage combination according to the invention in the case of a comparable transmission ratio facilitates an in total higher rigidity and thus improved dynamics. This is because, when using a low working volume, an only low compressibility of the hydraulic fluid and a low leakage, with a hydraulic transmission unit it is clearly easier to realize particularly high dynamics than with a pure cable system. This is because in the case of a pure cable system by the number of the necessary pulleys the mass of the system would turn out relatively high. The different properties of the two transmission stages in a particularly easy way allow for achieving an adjustment of the total parameters of the stroke transmitter to the requirements of the respective application. If a particularly high energy efficiency is important for the respective application, for instance a higher share in the total transmission can be realized with the cable system. Hereby the total mass and thus also the losses are kept particularly low. If, however, particularly high dynamics are still important for the respective application, a comparatively high share in the total transmission can be realized with the hydraulic transmission unit. Hereby a particularly high rigidity and thus particularly high dynamics of the stroke transmitter can be achieved. Thus, the basic concept of the stroke transmitter according to the invention via the dimensioning of the two transmission stages allows for a particularly flexible adjustment to the respectively required system parameters.

The actuator device according to the invention comprises an actuator and a stroke transmitter according to the invention, which is mechanically connected in series to the actuator. The advantages of the actuator device therein are analogous to the advantages of the stroke transmitter described above.

Advantageous embodiments and further developments of the invention derive from the claims depending on claims 1 and 11 as well as the following description. Therein, the described embodiments of the stroke transmitter and the actuator device can be combined with each other in a generally advantageous way.

Thus, according to an advantageous embodiment the cable system can be designed as hoist pulley system. Such a hoist pulley system may in particular comprise a motion-transmitting cable and a plurality of deflector pulleys. An advantage of this embodiment is that in this way a desired path transmission ratio can be adjusted relatively easily. In particular the transmission ratio can be influenced by the choice of the number of deflector pulleys. At the same time by the choice of a cable with a low elasticity and a high tensile strength a mechanical transmission unit with high rigidity and low mass can be provided.

In such a hoist pulley system the number n of the deflector pulleys may advantageously be at least 2, particularly advantageously at least 4, and may lie in particular between 2 and 20. These pulleys can in particular be grouped in individual blocks, wherein the pulleys of a common block each are fixed to a common carrier body. In particular in total two such opposite blocks, each with a multitude of pulleys, can be provided. The rotation angle of the cable over the pulleys of the two blocks may advantageously amount to about 180°. In other words, then substantially half of each pulley is surrounded by the cable.

In addition to the described two blocks of pulleys the hoist pulley system may also comprise a further lateral deflector pulley, in which the rotation angle of the cable is variable depending on the actuation position. This variable rotation angle therein may in particular be in the range between 90° and 180°. The variation of the rotation angle therein is due to the motion of an output body of the cable system, which is firmly connected to the cable, this means for instance by the movement of a plunger. This means that it may in particular be a lateral deflector pulley on the output side.

Generally and irrespectively of the exact embodiment and number of the deflector pulleys, the hoist pulley system basically may be a factor pulley system, an exponential pulley system and/or a differential pulley system.

Generally advantageously the cable system may have a transmission ratio of less than 1. With this transmission ratio a motion of a drive body of the cable system is transmitted to a motion of an output body of the cable system. In the case of a transmission ratio of below 1 the stroke on the output side is larger than the stroke on the drive side. This means that the transmission ratio named here should generally be understood as the ratio of the stroke on the drive side to the stroke on the output side of the respective transmission device. In the case of an increasing stroke this transmission ratio is correspondingly smaller than 1. Particularly preferably the cable system has a transmission ratio of 1:2 or less. This means that with a transmission ratio of below 1:2 an even higher than the two-fold stroke increase is obtained. In other words, then the stroke on the output side in relation to the stroke on the drive side of the cable system is at least doubled. This means that hereby in the second transmission stage of the actuator device a significant (further) stroke transmission is achieved. Thus for the stroke transmitter as a whole a sufficiently high stroke of the output body can be achieved, which is sufficient for the respective application. This may in particular also be achieved for actuators with relatively small primary stroke.

With a cable system advantageously a transmission ratio in a generally advantageous range between 1:2 and 1:50 can be easily realized. A transmission ratio in an advantageous range between 1:2 and 1:20 can therein be realized with comparatively low equipment expenditure.

Generally advantageous and irrespectively of the exact design of the cable system in the stroke transmitter the hydraulic transmission unit and the cable system together may have a total transmission of 1:2 or less and in particular of 1:4 or less. In other words, both transmission stages can interact in such a way that for the output body a stroke is achieved, which in relation to the stroke of the actuator is at least doubled and in particular at least quadrupled. Particularly preferred this total transmission ratio can amount to 1:10 or less, in particular to 1:20 or less, further particularly preferred to 1:50 or less and in particular even at 1:100 or less. Such high total transmissions allow for achieving even with primary actuators with only very low stroke (such as for instance piezo actuators) a sufficiently high stroke of the output body.

In this way the output body can generally advantageously have a stroke of at least 0.5 mm and in particular at least 2 mm. In other words, the output body can be moved by the primary stroke of the actuator and the stroke-multiplying effect of the two transmission stages by at least this stroke. The stroke of the output body may for instance for many applications be advantageously in a range between 0.5 mm and 5 mm.

As an alternative to the described embodiments with a stroke-increasing transmission of the cable system and/or the entire stroke transmitter, however, it is generally also possible, and possibly also advantageous, if the respective transmission ratio is chosen larger than 1. This may in particular apply to the transmission ratio of the hydraulic transmission unit per se, to the transmission ratio of the cable system per se, and above all to the transmission ratio of the stroke transmitter as a whole. In this way on the respective output side a larger force can act than the force available on the drive side. Thus, this embodiment variant is generally advantageous for applications in which high forces are required. Particularly advantageously the transmission ratio for each of the two transmission stages can generally be larger than 2 and in particular be in the range between 2 and 10.

Generally and irrespectively of the exact design of the transmission ratios the output body may be an elongated plunger. Such a plunger may in particular be supported with substantially only one translational degree of freedom. For such a one-dimensionally movable support in particular a sliding bushing can be employed. In other words, the plunger then acts as translation body. This means that the motion of the cable is then transmitted to a one-dimensional motion of this translation body.

As an alternative to the embodiment with a translation body the output body may also be a rotation body. In other words, by the transmission unit the translational motion can also be transmitted into a rotary motion of a rotary body. Such a transmission into a rotary motion may for instance be effected by a connection with a pulley.

According to an advantageous embodiment of the hydraulic transmission unit, the latter may comprise a drive element and an output element. It may in particular be configured to transmit a motion of the drive element with a path transmission ratio of less than 1 to the output element. In other words, this means that also by the hydraulic transmission unit preferably an increase of the stroke is to be effected. Particularly advantageously the transmission ratio of the hydraulic unit may be at most 1:2 and in particular 1:10, very particularly advantageously even at most 1:20 or even at most 1:50. This means that already in the first stage of the entire actuator device a corresponding increase of the stroke can be achieved, wherein this stroke of the hydraulic unit then is further increased once again by the described advantageous transmission ratio of the cable system.

According to a generally advantageous embodiment of the hydraulic transmission unit, the latter is chargeable with a hydraulic fluid. In particular it comprises a first and a second chamber, which are hydraulically connected to one another and one of which is configured as drive chamber and the other as output chamber. Herein, in general the drive chamber and the output chamber can either be fluidically connected by a line or also merge directly into each other as subareas of a superordinate chamber volume. This basic setup of the hydraulic transmission unit is for instance known from the unexamined specification documents laid open to public inspection DE 102016213654 A1 and DE 102013219759 A1.

According to a particularly preferred embodiment of the hydraulic transmission unit at least in the first chamber (that is either in the drive chamber and/or in the output chamber) a piston may be movably arranged along a piston axis. Therein this piston may separate the first chamber into a work chamber, which is variable in terms of volume, and a rear side chamber, wherein the rear side chamber is bounded at least in part by a bellows element of variable axial length. In other words, the hydraulic unit is neither a pure piston system, nor a pure bellows system, but rather a mixed piston-bellows system, in which both types of bounding elements are present next to each other at least in one of the two chambers. In particular even both chambers (drive chamber and output chamber) may be realized as such mixed piston-bellows system. Particularly advantageous embodiments of such a mixed piston-bellows system are described in more detail in the international application with the title "Hydraulic Transmission Unit for an Actuator", filed by the Siemens AG and the MetisMotion GmbH on the same application date, which therefore is meant to be included in the disclosure content of the present application. Alternatively the hydraulic transmission unit, however, may also be realized as pure piston system or also as pure bellows system, as they are equally described in more detail in the above-cited application filed in parallel. With regard to possible applications and further advantageous embodiments of the stroke transmitter, moreover, also the German application with the title "Triggering Apparatus for an Electrical Switch Device", filed by the Siemens AG on the same application date, is to be included in the disclosure content of the present application.

Generally advantageously and irrespectively of the exact design of the hydraulic transmission unit, the latter may comprise a reservoir chamber for the hydraulic fluid. Such a reservoir chamber may in particular be fluidically connected or connectable to the rear side chamber described above. It may in particular then be expedient if a motion of the piston is not entirely neutral in terms of volume for the rear side chamber. A small change in the volume of the rear side chamber thus can be compensated for by a fluidic coupling to the reservoir chamber. Alternatively or additionally, a coupling to a reservoir chamber, however, may also be useful for compensating for a change in volume of hydraulic fluid caused by a change in temperature. In a particularly advantageous variant of this embodiment the reservoir chamber is pressurizable. Such a possibility for pressurization may be realized for example by an additional bellows element or a piston in the area of the reservoir chamber. Hereby the reservoir chamber can be pressurized with a pressure that is for instance higher or lower than the pressure in the rear side chamber, which is fluidically coupled to the reservoir chamber. Thus, for instance by an actuator element, which is present in the area of the reservoir chamber, the entire hydraulic system can be preloaded to a desired initial pressure, whereby in particular a desired initial position of an output body, which is present on the output side, can be adjusted. Therein the initial position of the output body adjusted in each case depends on the rigidities of the employed bellows elements as well as the preloading forces acting on the actuator body and the output body.

In general the hydraulic transmission unit may be charged with a hydraulic fluid. This means that in this embodiment the hydraulic fluid is already part of the transmission unit. For realizing the invention, however, it is generally sufficient if the transmission unit comprises a chamber system that is suitable for being charged with the hydraulic fluid. A suitable hydraulic fluid is for instance a silicone oil, a glycol, or also a liquid metal. If the transmission unit is charged with the hydraulic fluid, the latter is present both in the drive chamber and in the output chamber (and therein possibly in each case both in the work chamber and in the rear side chamber) and in addition in one or more optionally existing connection lines and/or reservoir chambers. Generally, drive chamber and output chamber can be either fluidically connected by a line or also merge directly into each other as subareas of a superordinate chamber volume.

Generally advantageous the entire work volume of the hydraulic transmission unit may amount to 1 ml or less. In particular the work volume may lie in the range of below 0.5 ml or even below 0.1 ml and in particular between 0.01 ml and 0.5 ml or between 0.01 ml and 0.1 ml, respectively. With such a low work volume a transmission unit with a high rigidity and/or high pressure can be realized particularly easily.

According to a further advantageous embodiment the hydraulic transmission unit may be configured as a pumpable transmission unit so that by several subsequent individual motions in the area of the drive chamber a summed motion in the area of the output chamber can be generated. Such pump effect is for instance described in the DE 102017214697 A1 and in the European patent application with the file reference 17203689.9, which therefore are to be included in the disclosed content of the present application. In such an embodiment not only a transmission is effected but also a summation of the individual motions of a drive body into a summed total motion of an output body. For this purpose for instance one or several check valves may be provided in the hydraulic line between the work chamber on the drive side and the work chamber on the output side. Optionally, one or several pump reservoirs, which are capable of being hydraulically coupled to the work volume, may be additionally provided.

According to an advantageous embodiment of the actuator device the actuator is a solid state actuator. In such solid state actuator the described advantages of the design of the downstream transmission units according to the invention become particularly effective, since in particular the stroke of a solid state actuator in practice is very limited and for power transmission high rigidities depending on the actuator type are advantageous. For instance, a solid state actuator typically has a high natural frequency and thus advantageously high dynamics.

According to a particularly preferred variant the solid state actuator is a piezo actuator. Piezo actuators in the past have turned out to be particularly promising primary actuators. By them a particularly precise motion can be achieved. Their main disadvantage, namely their low mechanical stroke, can be compensated for by the subsequent transmission units, as described. Even with a corresponding reduction of the force through the transmission stages the force is still sufficient for many applications.

Particularly preferably the piezo actuator of the actuator device is configured as piezo stack actuator. A piezo stack actuator is a series connection of several individual piezo elements arranged as layer stack, which is generally known from the prior art. Such a stack actuator is particularly advantageous for achieving already with the piezo actuator a higher motion amplitude than this would be possible with an individual piezo element.

The invention, however, is not limited to a piezo actuator as solid state actuator. For instance many of the known advantages and disadvantages of piezo actuators also apply to other kinds of solid state actuators. For these, too, a relatively low output stroke can be increased by the subsequent transmission units. According to a preferred embodiment variant the named solid state actuator is for example a magneto-strictive actuator or an electro-strictive actuator. Alternatively, the solid state actuator may also be a shape memory actuator.

According to a further advantageous embodiment of the actuator device, the latter may comprise at least two subsystems mechanically connected in parallel, wherein each subsystem comprises an actuator and a stroke transmitter according to the invention, which is mechanically connected in series thereto. This means that each of the subsystems may comprise an actuator, a transmission unit, which is mechanically connected in series to the actuator, and a cable system, which is mechanically connected in series to the hydraulic transmission unit. In particular therein the individual cable systems may be mechanically coupled to a common, superordinate output body so that a simultaneous control of the two actuators leads to a jointly caused motion of the superordinate output body by the two hydraulic transmission units and the two cable systems.

By such a doubling or multiplying, respectively, of the actuators, the hydraulic transmission units, and the cable systems and by their mechanical parallel connection it can be effected in particular that for the motion of the output body a correspondingly higher energy is available. Particularly advantageous is a symmetrical, uniform design of the two subsystems, whereby for instance a doubling of the available energy can be achieved. In particular with a mirror-symmetrical arrangement of two subsystems therein advantageously an approximate doubling of the energy with a straight, fluid movement of the output body can be achieved since jamming can be advantageously avoided. Generally particularly advantageously, the two subsystems may be arranged in a common housing.

According to an advantageous embodiment variant of the actuator device it may be an actuator device for a robot and/or for a robotic system. This means that the actuator device can advantageously be used in a robot and/or a robotic system. In particular the actuator device can be employed for movement or positioning, respectively, of an end effector in robotics. For such an application in particular a comparatively high mechanical stroke in the range of several mm to several 10 cm is required.

According to an advantageous embodiment variant of the actor device it may be an actuator device for a stroke system for checking an electronic component. Such a stroke system in expert circles is also referred to as lifting table. Also for the use of the actuator device for such a lifting table a comparatively high mechanical stroke of at least several mm to several centimeters is advantageous. In this application for example an electronic component (for instance a light-emitting diode) to be tested for its function is lifted onto a support and a measuring voltage is applied thereto.

According to an alternative advantageous embodiment variant and use of the actuator device, the latter may be designed as an actuator device for metering an injection of a fluid. For instance the actuator device may be designed for injection of a medicine into a patient. Alternatively, the actuator device may be designed for injection of a fluid chemical into a chemical reaction container. In this case also for such metering of a fluid to be injected a stroke of at least several mm is advantageous. This applies in particular if the liquid volume is in the range of several milliliters.

BRIEF DESCRIPTION OF THE DRAWINGS

In the following the invention is described based on several preferred embodiments by reference to the attached drawings, which show in.

In the figures same elements and elements having the same function are equipped with same reference signs.

DESCRIPTION OF THE PREFERRED EMBODIMENTS

Figure 1:
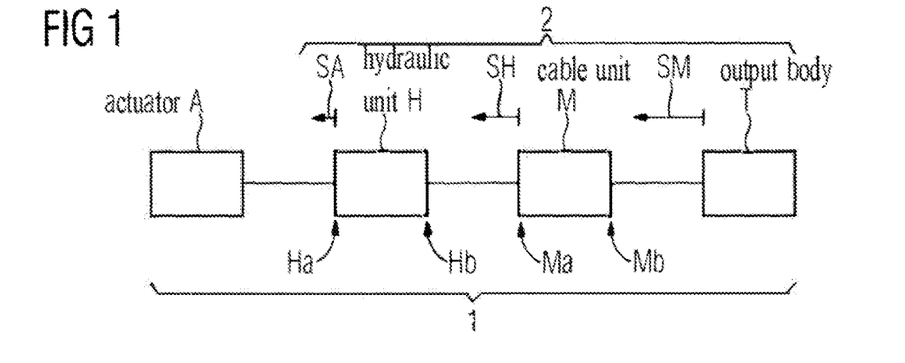
FIG. 1 a schematic principle representation of an actuator device according to a first example of the invention, FIG. 2 a schematic representation of a hydraulic transmission unit, FIG. 3 a schematic representation of a cable system, FIG. 4 a schematic representation of an alternative cable system, FIG. 5 the cable system of FIG. 4 in a different actuation position, FIG. 6 a schematic principle representation of an actuator device according to a second example of the invention, FIG. 7 a schematic representation of the two hydraulic transmission units of FIG. 6, FIG. 8 a schematic representation of the two cable systems of FIG. 6, FIG. 9 a schematic total view of the hydraulic transmission units and the cable systems of FIG. 6, FIG. 10 the temporal progression of the voltage and the strokes as a function of time in such a system, and FIG. 11 the temporal progression of electrical voltage, current, power, and energy as a function of time.

In FIG. 1 a schematic principle representation of an actuator device 1 according to a first embodiment of the invention is shown. Therein the connections between the boxes in each case stand for a mechanical coupling of the individual elements. The actuator device 1 comprises an actuator A, a hydraulic transmission unit H, which is mechanically connected in series to the actuator, and a cable system M, which is mechanically connected in series to the hydraulic transmission unit H. Therein, hydraulic transmission unit H and the cable system M together form a stroke transmitter 1. The cable system M acts as a mechanical transmission unit, which is connected downstream as second transmission stage of the hydraulic transmission unit H. By the cable system M an output body T is movable, by which for a given application a motion of an external element can be effected. Depending on the application, therein a stroke of for instance several mm may be necessary. The actuator device 1 is configured to achieve this stroke by two subsequently connected transmission units, namely the hydraulic transmission unit H and the cable system M as mechanical transmission unit.

The primary stroke within the actuator device 1 is generated by an actuator A, which for instance may be a piezo actuator. The stroke of this actuator A is denoted by SA. This is at the same the stroke acting on the drive side Ha of the subsequent hydraulic transmission unit H. The transmission ratio of this hydraulic transmission unit in the present example is chosen in such a way that the stroke on the output side Hb of the hydraulic transmission unit H in comparison with the primary stroke is increased. The stroke on the output side is denoted by SH. This is at the same time the stroke acting on the drive side Ma of the subsequent cable system M. The increase of the strokes herein is pointed out by an increasingly larger arrow, wherein this increase, however, is not true to scale. Also by the transmission ratio of the subsequent cable system M a further increase of the stroke is achieved. Thus the stroke SM on the output side Mb of the cable system M is here increased by a further factor. This initial stroke SM is at the same time the stroke achieved at the output body T of the actuator device 1.

Figure 2:
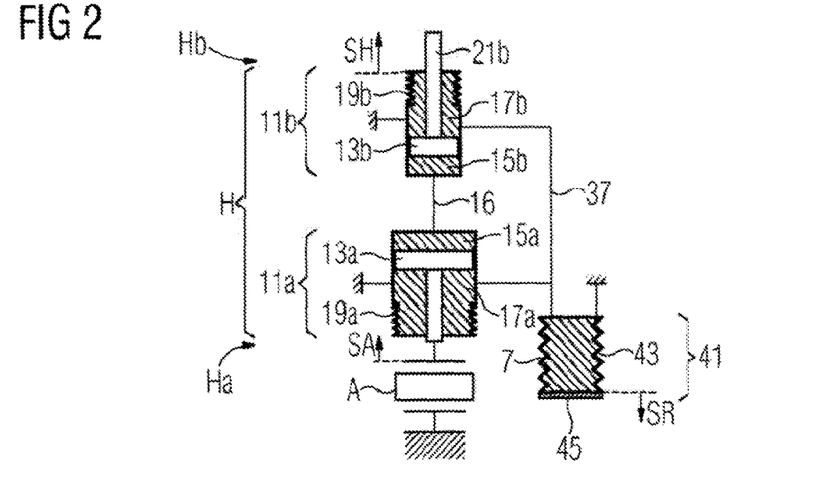

In the following figures now the operating mode of the two subsequently connected transmission units is explained in more detail. Thus, FIG. 2 shows a schematic representation of a hydraulic transmission unit H, as it may for instance be employed in the embodiment of FIG. 1. This hydraulic transmission unit H is connected in series to the actuator A. The stroke SA of the drive side Ha is transmitted by the hydraulically coupled interaction of two pistons 13a and 13b into a stroke SH on the output side Hb. The transmission ratio therein is determined by the ratio of the hydraulic surfaces of the two associated piston bodies. The first work chamber 15a forms a subarea of the drive chamber 11a, which is variable by the piston motion, and the second work chamber 15b forms a subarea of the output chamber 11b, which is variable by the piston motion there. The two work chambers 15a and 15b are fluidically coupled by a hydraulic line 16. The rear side volumes of the two chambers 11a and 11b are here designed to be encapsulated. In other words, each of the two chambers 11a or 11b, respectively, are separated by the piston into a work chamber 15a or 15b, respectively, and a rear side chamber 17a or 17b, respectively. The two rear side chambers each are fluidically encapsulated against the outer environment. They are each at least in part bounded by a bellows element 19a or 19b, respectively, of variable axial length. In the shown example in each case a part of the side wall of the respective rear side chamber is formed by such a bellows. This bellows facilitates that the rear side chamber may be encapsulated and that a volume compensation during the motion of the respective piston can still take place. In the example of FIG. 2 both the drive chamber 11a and the output chamber 11b are realized with such a flexibly encapsulated rear side chamber. Both rear side chambers are fluidically coupled via a line 37 to a reservoir chamber 41 for the hydraulic fluid 7. This reservoir chamber 41 is laterally bounded by a bellows element 43. Via a cover plate 45 a pressure can be applied to the reservoir chamber by a preset stroke SR. Via the output body 21b (which here shows the piston pin of the output chamber) the stroke SH increased according to the transmission ratio can be transmitted to the subsequent cable system. The exact mode of functioning and further advantageous designs of such a combined piston-bellows system are described in more detail in the above named international application filed in parallel with the title "Hydraulische Übersetzungseinheit für eine Aktoreinrichtung".

Figure 3:
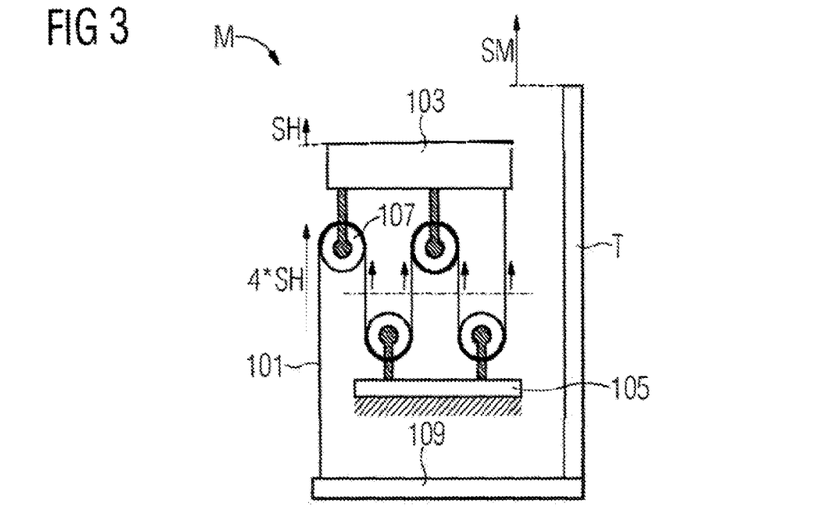

FIG. 3 shows a schematic representation of a cable system M, as it may be employed for instance in the actuator device of FIG. 1. On the drive side of this cable system a drive body 103 is located. This drive body 103 can be moved by the stroke SH, which is already increased by the hydraulic unit. This stroke SH is now transmitted by the subsequent cable system M to a still further increased SM on the output side of the cable system. For this purpose the cable system M is designed as hoist pulley system comprising a motion-transmitting cable 101 and a plurality of deflector pulleys 107. Exemplarily in the cable system of FIG. 3 four deflector pulleys are shown. This number, however, may be even significantly larger in a real system, in order to achieve a larger increase. An end of the motion-transmitting cable is connected to the drive body 103. The opposite end of the cable is connected to the output body 109. The output body 109 is here in turn firmly connected to the superordinate output body T. This superordinate output body T is here realized as translation body (in particular as plunger). The translation body T may be supported in a sliding bushing, which is here not shown in further detail, that it is movable substantially only one-dimensionally in the direction of the arrow SM.

By the four deflector pulleys in the area of the output body 109 a stroke is generated, which is increased by the factor 4, that is SM=4·SH. This factor, however, is meant to point out only in principle how by the choice of the number of deflector pulleys in a factor pulley system a certain desired transmission ratio can be achieved, and here this is a ratio of 1:4. The deflector pulleys 107 are here grouped in two blocks, which occasionally are also referred to as shears of a hoist pulley system. Therein a first block consists of the two pulleys which are connected to the drive body 103. The second block consists of the two pulleys which are connected to the fixing body 105. This means that drive body 103 and fixing body 105 form the two substantial carrier bodies for the blocks of the hoist pulley system.

Figure 4:
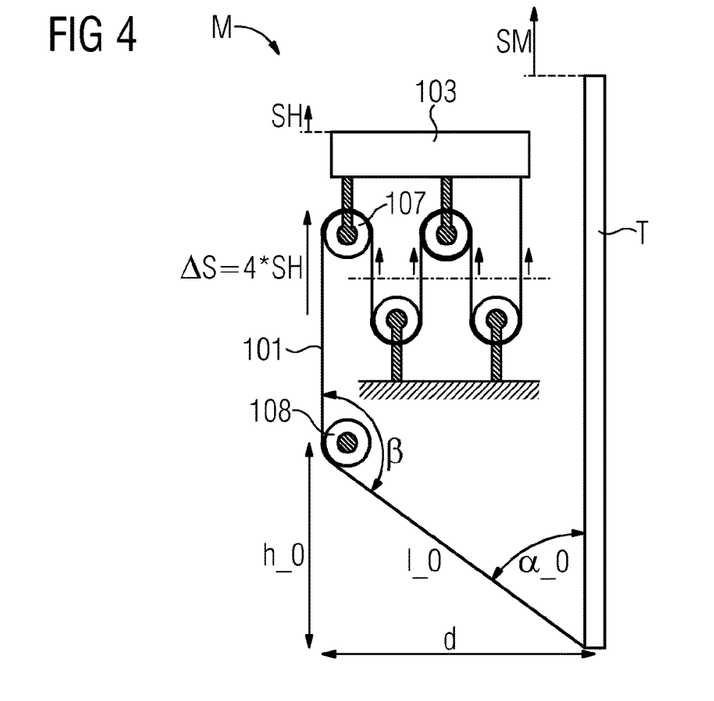

In FIG. 4 a schematic representation of an alternative embodiment of the cable system M is shown. The operating mode of this alternative cable system in principle is similar as in the example of FIG. 3. In contrast thereto, however, here an additional lateral deflector pulley 108 is provided. In contrast to the already described deflector pulleys 107 the cable runs around this pulley not with a rotation angle of 180° but with a smaller rotation angle β, which here is between 90° and 180°. By the additional lateral deflector pulley 108, on the one hand, the transmission of the motion to the only linearly movable superordinate output body (or translation body) T is rendered easier. On the other hand, hereby the achievable stroke increase can be raised still further.

Figure 5:
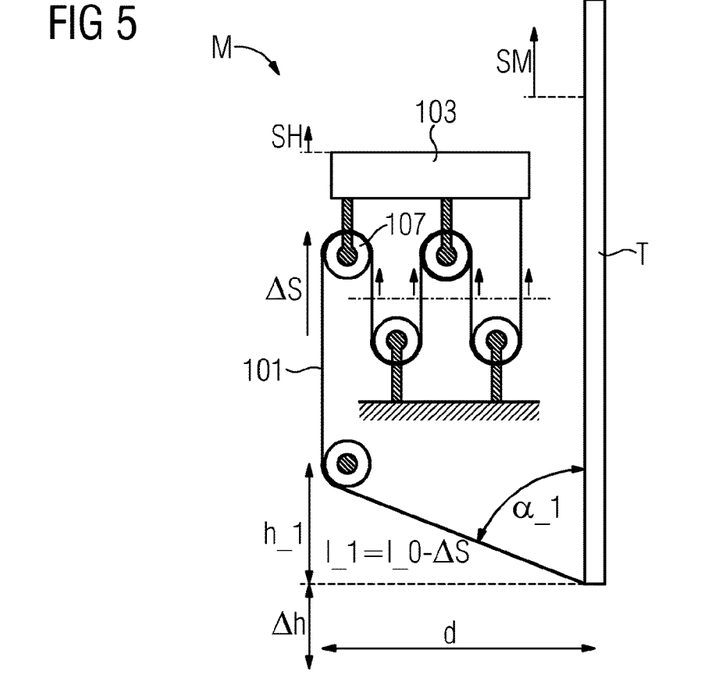

The influence on the transmission ratio becomes clear from FIG. 5, which shows the cable system of FIG. 4 in a different actuation position. In comparison with the position of FIG. 4 here the drive body 103 is displaced upwards by a certain stroke SH. In the area in front of the deflector pulley 108 on the output side this results in a stroke of the cable 103, which is given as Δs=4·SH. In the area after the lateral deflector pulley 108 the effect of this change is as follows:

The length section of the cable between the lateral deflector pulley 108 and the translation body T in the position of FIG. 4 had a length I_0. By the stroke of the cable Δs=4·SH in front of the lateral deflector pulley the length of this section is shortened to the value I_1=I_0–Δs. The angle included between the cable 101 and the translation body T therein changes from α_0 to α_1. The vertical distance between lateral deflector pulley and translation body (that is the height of the formed triangle) changes from h_0 to h_1, whilst the horizontal distance d due to the only one-dimensionally movable support of the translation body T remains constant. The height difference Δh=h_1–h_0 thus corresponds to the one-dimensional path length of the translation body and thus the stroke SM. Based on the theorem of Pythagoras this height difference can be calculated using the following equation:

$$SM = \Delta h = h\_0 - \text{sqrt}((I\_0 - \Delta s)^2 - d^2)$$

Figure 6:
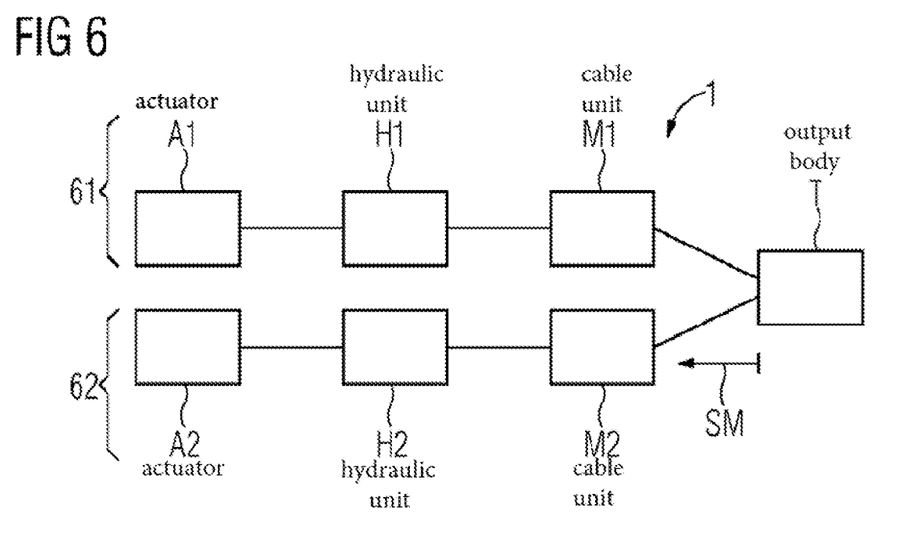

FIG. 6 shows a schematic principle representation of an actuator device 1 according to a second example of the invention. In contrast to the preceding example, here the actuator device 1 is composed of two subsystems 61 and 62, which are mechanically connected in parallel. Each of the two subsystems comprises an actuator A1 or A2, respectively, and a stroke transmitter. Each of these two stroke transmitters has a hydraulic transmission unit H1 or H2, respectively, which is mechanically connected in series to the respective actuator, and a cable system M1 or M2, respectively, which is mechanically connected in series to the respective hydraulic transmission unit. The two cable systems M1 and M2 are mechanically coupled to a common superordinate output body T. This has the effect that a simultaneous control of the two actuators A1 and A2 leads to a jointly caused motion of the superordinate output body T. In comparison with the embodiment of FIG. 1 with only one such subsystem, therein the mechanical energy for moving the output body can be approximately doubled.

Figure 7:
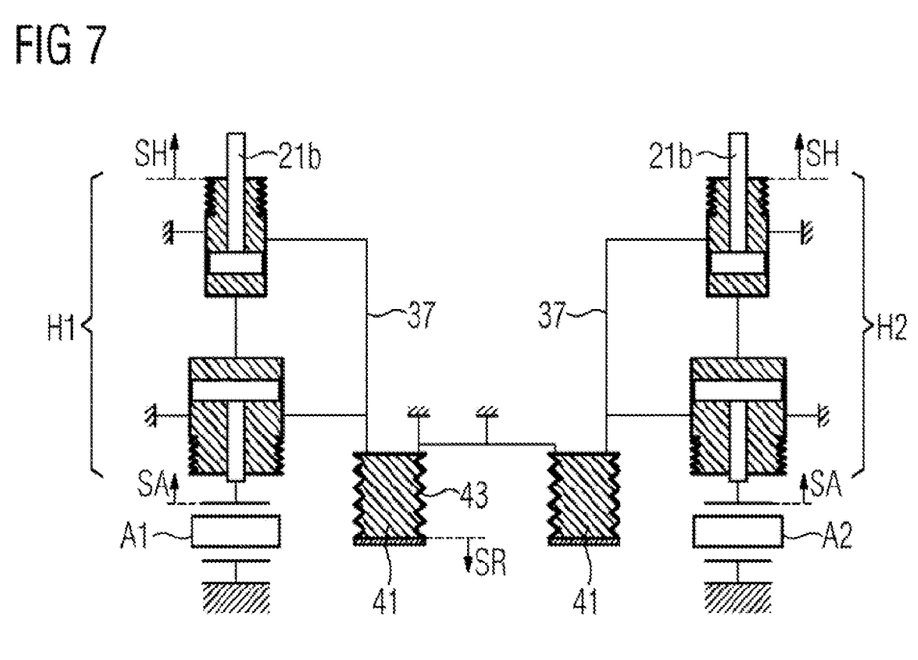

In the following figures examples are shown of what particularly advantageous, symmetrical embodiments of the hydraulic units H1 and H2 and the cable systems M1 and M2 of these two subsystems may look like. Thus, FIG. 7 shows a schematic representation of the two hydraulic transmission units H1 and H2, as they may be employed in particular in the example of FIG. 6. This means that here two actuators A1 or A2, respectively, are each mechanically connected in series to an associated hydraulic transmission unit H1 or H2, respectively. The individual hydraulic transmission units are here each designed in analogy to the example of FIG. 2 and arranged symmetrically next to each other in a butterfly type configuration. In the shown example the individual hydraulic transmission units H1 and H2 are not fluidically coupled to one another. Alternatively, they could, however, in principle also be fluidically coupled, for instance via a coupling of the two reservoir chambers 41 or also by a design comprising a common reservoir chamber. The two hydraulic transmission units are here mechanically connected in parallel. The two output bodies 21*b* are here designed in such a way that by simultaneous and rectified control of the two actuators at the same time a rectified stroke SH is generated at the two output bodies 21*b*. The two transmission units H1 and H2, which are mechanically connected in parallel, may also be regarded as a superordinate hydraulic transmission unit H with two inputs and two outputs.

Figure 8:
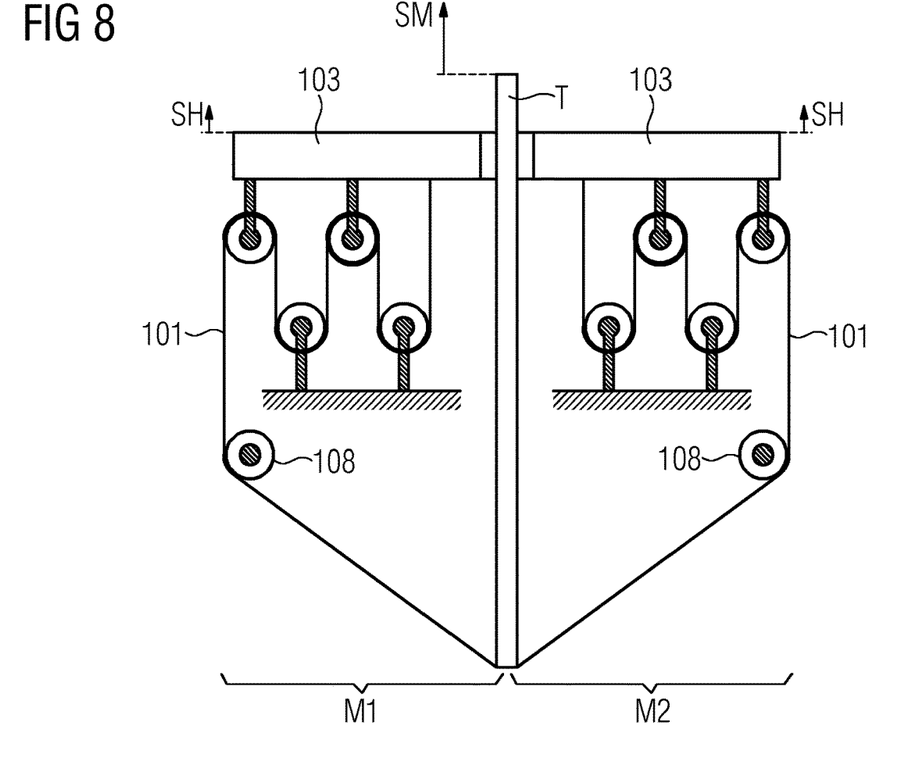

FIG. 8 shows a schematic representation of the two cable systems M1 and M2 as they may be employed in particular in the example of FIG. 6. These two cable systems M1 and M2 may in particular be coupled via their two drive bodies 103 to the output bodies 21*b* of the two hydraulic units of FIG. 7. The two cable systems M1 and M2 are here each per se designed similar as in the example of FIGS. 4 and 5. In contrast thereto here two such cable systems with their cable ends on the output side are coupled to a common superordinate translation body T. The arrangement of the two cable systems is mirror-symmetrical. They are arranged back to back in butterfly manner so that the two cables 101 symmetrically converge via the two opposite lateral deflector pulleys 108 at the translation body T. This butterfly type configuration in a simple way allows for a uniform, jam-free transmission of the motion to the jointly moved translation body T. Here, too, the two cable systems M1 and M2, which are mechanically connected in parallel, may be regarded as a superordinate cable system M with two inputs and a coupled output. For such a superordinate cable system also in particular a common, continuous cable may be used, which is jointly used by the two subsystems M1 and M2. Also the drive body 103 may be realized as a jointly used continuous plate.

Figure 9:
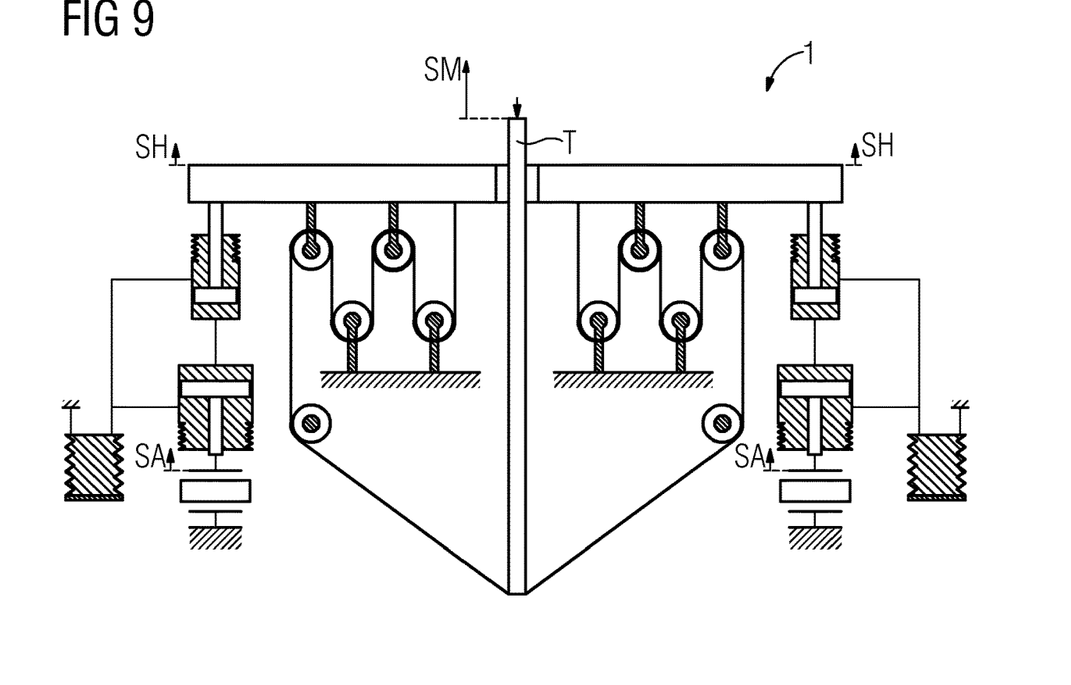

FIG. 9 shows a schematic total view of the two hydraulic transmission units H1 and H2 and the two cable systems M1 and M2 from the embodiment of FIG. 6. In particular here the two hydraulic transmission units H1 and H2 of FIG. 7 have been assembled in an overall symmetrical arrangement comprising the two cable systems M1 and M2 of FIG. 8. By such a symmetrical arrangement the advantage of the doubling of energy can be realized in a particularly simple and effective way. In particular all elements represented in FIG. 9 may be arranged in a common housing, which is not shown here. Hereby an easy to handle module can be provided, by which a sufficiently high total stroke SM of the superordinate output body T with a sufficiently high mechanical energy can be effected when both actuators A are electrically controlled at the same time.

Figure 10:
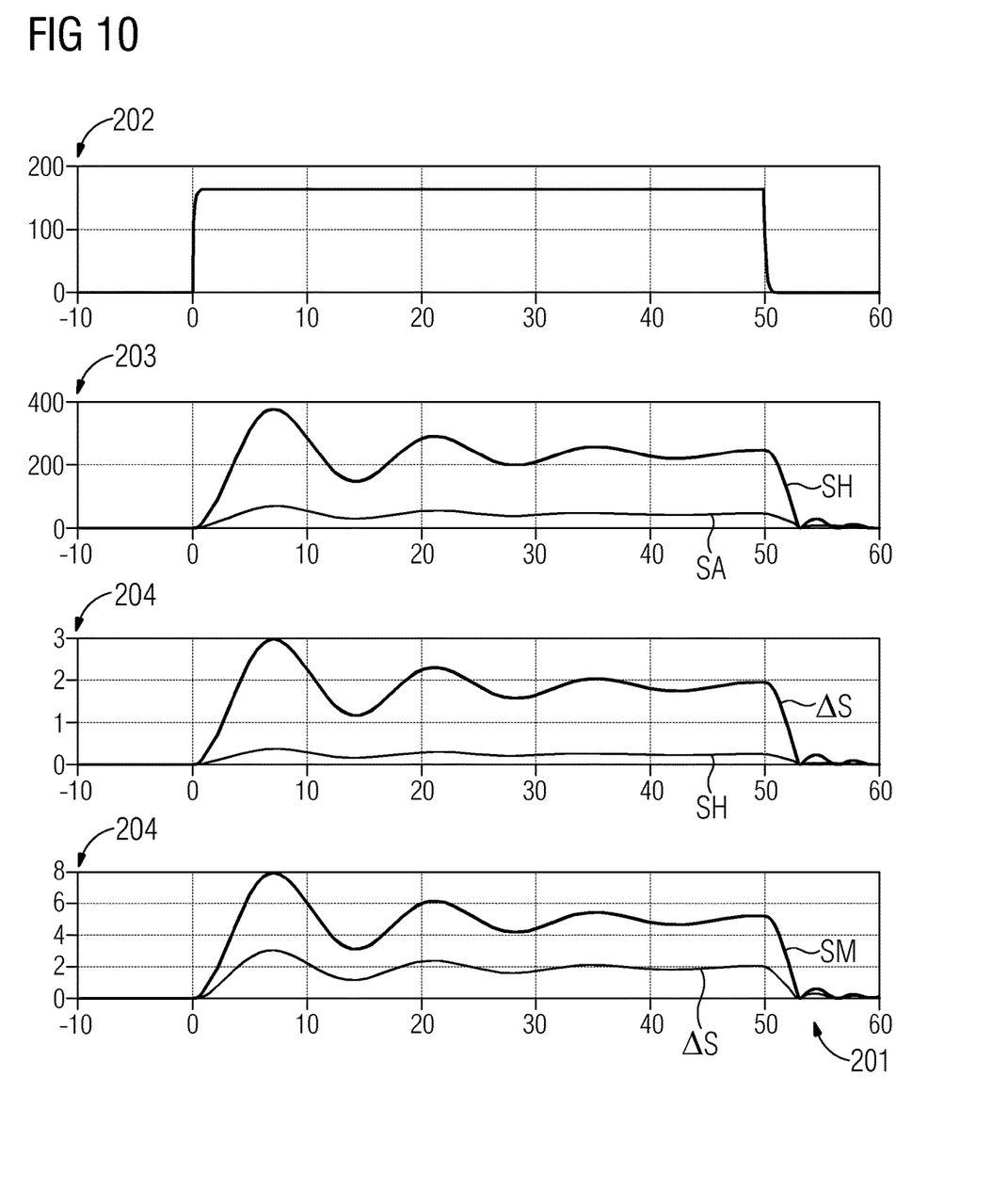
Figure 11:
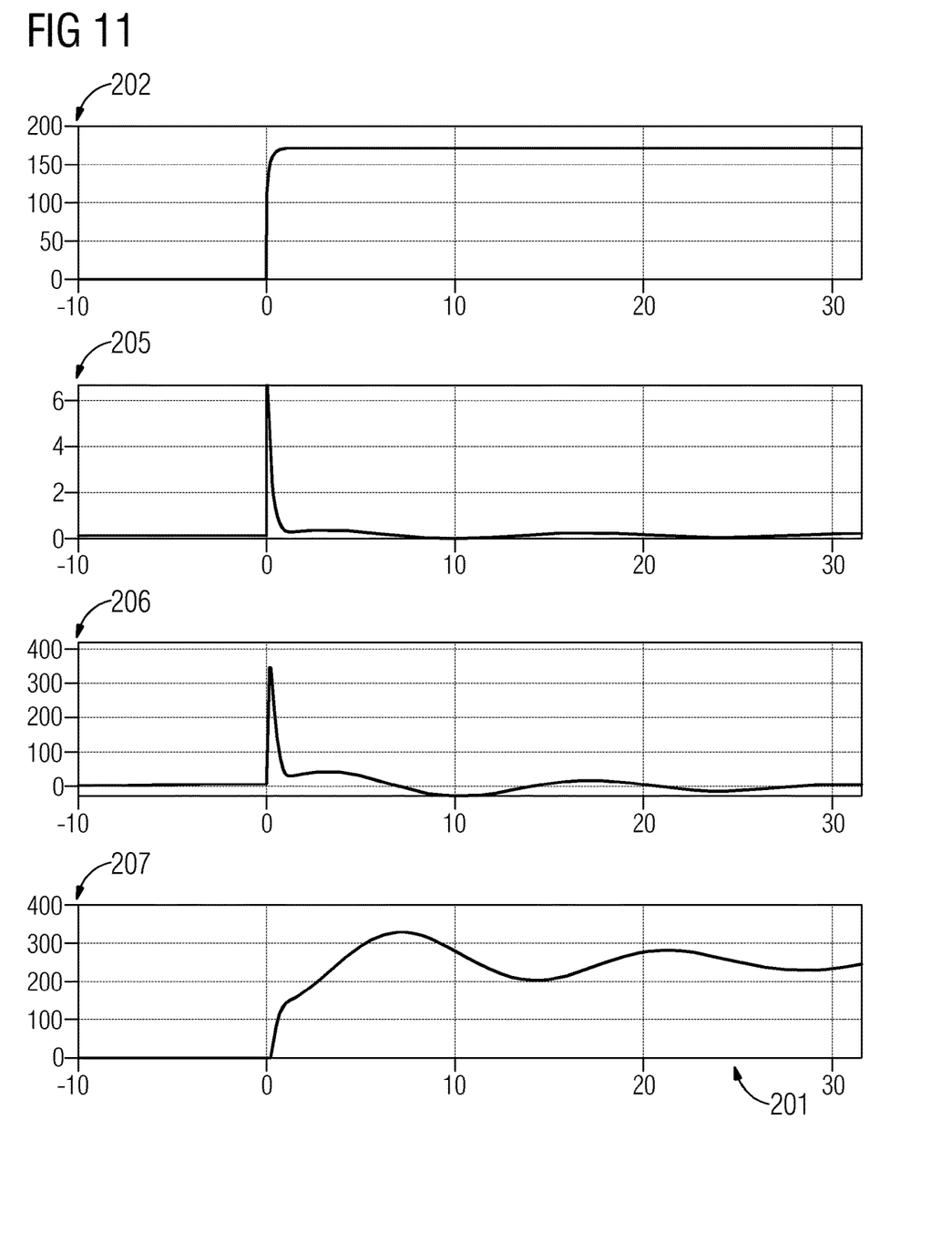

In FIGS. 10 and 11 the essential physical parameters for a realization of the actuator device of FIGS. 6 to 9 are shown, as they were calculated by a Simulink simulation. Various physical quantities are shown as a function of time 201 in milliseconds. For instance in the top graph of FIG. 10 the electrical voltage 202 applied to each of the two actuators A1, A2 is shown in Volt. These actuators are piezo actuators, which can be moved by applying such a voltage. Here an approximately delta-shaped voltage pulse of 160 V is applied, which acts over a period of 50 ms. The three graphs below show the stroke resulting therefrom in various places of the actuator device. Thus, by the reference sign 203 a stroke in micrometers is designated. The stroke SA is the primary stroke generated by each of the two piezo actuators A1 and A2, which acts as stroke on the drive side of the respective hydraulic transmission unit H1 or H2, respectively. This primary stroke is relatively low. By the transmission ratio of the respective hydraulic unit, however, on its output side a clearly increased stroke SH is achieved, which at the maximum of the graph reaches almost 400 p. In the third graph by 204 a stroke in millimeters is designated. Here the described stroke SH, which acts on the drive side of the respective subsequent cable system, is compared to a stroke Δs, which is present in the area of the respective lateral deflector pulleys 108. This stroke Δs at the maximum is already in the range of approximately 3 mm. Also in the fourth graph by 204 a stroke in millimeters is designated. Here the stroke of the cable Δs is compared to the stroke SM, which is given on the output side of the entire cable system, which means in the area of the output body T. By the function of the respective lateral deflector pulley 108 here still an additional stroke increase is given so that at the output body T a stroke SM of approximately 7 mm is achieved. By using two subsystems also a comparatively high mechanical energy (in other words: for a given stroke a comparatively high force) can be achieved.

In the individual graphs of FIG. 11 various electrical parameters are shown, which result from the simulation for the control of the two actuators A1 and A2. Thus, the top graph shows in turn the voltage 202 applied to the respective piezo actuator in Volt as a function of time 201 in milliseconds. In contrast to FIG. 10 here only approximately the first 30 ms after the start of the voltage pulse are shown. The second graph shows the current 205 flowing during control of the two piezo actuators in Ampere. The maximum of the current here amounts to almost 7 A. The third graph shows the electrical power 206 in Watt. The peak electrical power is here at almost 350 Watt. The fourth graph shows the total energy absorbed 207 in mJ. Both the peak electrical power and the total energy absorbed are clearly lower than in the comparable electromagnetic actuator described above, in which a peak power of 1200 W was measured.

This means that by the described actuator device the predetermined parameters for the stroke, the dynamics, and the force can be realized when moving the output body T, wherein at the same time the peak electrical power in comparison with the prior art is clearly reduced. This also has the effect that for an electrical line to the respective actuator a significantly smaller line cross-section can be employed than in the prior art.

The invention claimed is:

1. A stroke transmitter for an actuator device, comprising:
   a first transmission unit and a second transmission unit, which are mechanically connected in series to one another,
   wherein the first transmission unit is configured as a hydraulic transmission unit and, on its drive side, is connectable to an actuator, which drives the first transmission unit, and, on its output side, is connected to the drive side of the second transmission unit, which is driven by the first transmission unit,
   wherein the second transmission unit is configured as a cable system and, on its output side, comprises an output body.

2. The stroke transmitter according to claim 1, in which the cable system is designed as a hoist pulley system comprising a motion-transmitting cable and a plurality of deflector pulleys.

3. The stroke transmitter according to claim 1, in which the cable system has a transmission ratio of 1:2 or less.

4. The stroke transmitter according to claim 1, in which the hydraulic transmission unit and the cable system together have a total transmission ratio of 1:2 or less.

5. The stroke transmitter according to claim 1, in which the output body has a stroke of at least 0.5 mm.

6. The stroke transmitter according to claim 1, in which the output body is an elongated plunger, which is movably supported with substantially only one translational degree of freedom.

7. The stroke transmitter according to claim 1, in which the hydraulic transmission unit comprises a drive element and an output element and is configured to transmit a movement of the drive element with a transmission ratio of at most 1:2 to the output element.

8. The stroke transmitter according to claim 1, in which the hydraulic transmission unit is chargeable with a hydraulic fluid and comprises a first and a second chamber, which are hydraulically connected to one another and one of which is configured as a drive chamber and the other as an output chamber.

9. The stroke transmitter according to claim 8, in which at least in the first chamber a piston is movably arranged along a piston axis so that the piston separates the first chamber into a work chamber, which is variable in terms of volume, and a rear side chamber, wherein the rear side chamber is bounded at least in part by a bellows element of variable axial length.

10. The stroke transmitter according to claim 8, which in addition comprises a pressurizable, reservoir chamber for the hydraulic fluid.

11. The actuator device comprising an actuator and a stroke transmitter according to claim 1, which is mechanically connected in series to the actuator.

12. The actuator device according to claim 11, in which the actuator is a solid state actuator.

13. The actuator device according to claim 12, which comprises two subsystems, wherein each subsystem comprises an actuator and a stroke transmitter, which is mechanically connected in series to the actuator.

14. The actuator device according to claim 11, which is designed as an actuator device for a robot or a lifting table.

15. The actuator device according to claim 11, which is designed as an actuator device for metering an injection of a fluid.

* * * * *